United States Patent [19]

Toda

[11] Patent Number: 4,740,226
[45] Date of Patent: Apr. 26, 1988

[54] APPARATUS FOR THE PRODUCTION OF POROUS PREFORM OF OPTICAL FIBER

[75] Inventor: Yuichi Toda, Yokohama, Japan

[73] Assignee: Sumitomo Electric Industries, Ltd., Osaka, Japan

[21] Appl. No.: 7,377

[22] Filed: Jan. 27, 1987

[30] Foreign Application Priority Data

Jan. 27, 1986 [JP] Japan ................................. 61-13723

[51] Int. Cl.$^4$ .......................................... C03B 37/027
[52] U.S. Cl. ..................... 65/11.1; 65/3.12; 65/18.2; 65/144
[58] Field of Search ................ 65/2, 3.11, 3.12, 18.2, 65/144, 11.1

[56] References Cited

U.S. PATENT DOCUMENTS

| | | | |
|---|---|---|---|
| 4,390,357 | 6/1983 | Myers et al. | 65/13 X |
| 4,414,008 | 11/1983 | Edahiro et al. | 65/3.12 |
| 4,419,116 | 12/1983 | Nakahara et al. | 65/3.12 |
| 4,421,540 | 12/1983 | Nakahara et al. | 65/3.12 |

FOREIGN PATENT DOCUMENTS 60-90844  5/1985  Japan ..................................... 65/3.12

Primary Examiner—Robert L. Lindsay
Attorney, Agent, or Firm—Cushman, Darby & Cushman

[57] ABSTRACT

In an apparatus for the production of a porous optical fiber preform in a reaction container is provided in which a bar like starting member is movably supported for rotating and reciprocally moving across a gas flow, and a burner is provided for generating glass particles. An opening is provided on one side of the reaction container for introducing a gas flow and another opening is located on the other side of the reaction container opposite to the first mentioned opening, so that the gas flow is rectified in the reaction container and the glass particles can be deposited on the starting member with a uniform density distribution.

3 Claims, 3 Drawing Sheets

APPARATUS FOR THE PRODUCTION OF POROUS PREFORM OF OPTICAL FIBER

BACKGROUND OF THE INVENTION

1. Field of the Invention

The present invention relates to an apparatus for the production of a porous preform of an optical fiber.

2. Description of the Prior Art

Various methods for the production of the porous preforms of optical fibers are known for examples, the vapor axial deposition (VAD) method in which silicon tetrachloride is added to a oxyhydrogen flame, causing fine particles of silicon dioxide to be deposited on the surface of a starting member in the longitudinal direction so that the porous preform of the optical fiber is prepared. In this method, a multi tube type burner is used so that the silicon tetrachloride and the burning gas can be jetted through some tubes of the burner for reaction with additives such as germanium tetrachloride jetted from other tubes of the burner so as to produce germanium dioxide resulting in a porous preform having a predetermined spacial distribution density of silicon dioxide and germanium dioxide with respect to the radius direction of the porous preform.

In the OVD method silicon tetrachloride and germanium tetrachloride are supplied to an oxyhydrogen flame as additives in a predetermined mixture ratio and the frame is jetted onto the starting member, moving the starting member in its longitudinal direction. The mixing ratio of silicon tetrachloride and germanium tetrachloride is gradually changed, whereby the porous preform of the optical fiber having a predetermined radius distribution of germanium dioxide is produced.

As additives for changing the refraction index of the preform, any other one or more additives may be used in place of germanium tetrachloride.

Although the examples are explained with respect to methods such that additives are mixed for reaction, a method in which the porous preform of pure silicon dioxide $SiO_2$, is first prepared, with suitable additives injected to the porous member at the time of sintering is also known.

The preform of the optical fiber is produced in the manner described above, and it is the stability and uniformity of the production condition at the time of producing the porous preform that determines the quality of the preform of the optical fiber.

Therefore, in the VAD method, it is essential to stabilize the spacial density distribution. When the spacial density distribution changes, the refractive index in the preform also changes and the desired characteristics of the optical fiber can not be obtained. A further consideration is the uniformity of the volume density of the porous glass preform. If the volume density of the preform is not uniform, the outer diameter of the porous preform may be changed at the time of sintering, and in the extreme case, the preform may be broken due to the internal thermal stress.

In the OVD method, it is necessary to eliminate aged deterioration of the deposit on the starting member. If there is the aged deterioration of the deposit, the refractive index of the porous preform of the optical fiber is undesirably changed. It is also necessary that the volume density of the porous preform of the optical fiber is kept uniform. If the volume density is not uniform, the outer diameter of the porous preform of the optical fiber may be changed and in the extreme case, the preform may be broken due to the internal thermal stress.

Further is important to keep the volume density distribution uniform for controlling the size of the finished preform in case of depositing only the pure silicon dioxide.

From the foregoing, it is necessary to deposit the fine particles on the starting member in a stable manner.

However, the various changes such as change of the spacial density distribution of the additives, change of the deposit on the starting member and change of the volume density of the porous glass tend to occur even if the supplying volume of the sintered glass and silicon tetrachloride are strictly controlled. These changes are caused by a change in the relationship between the deposit object and flame due to either the fluttering of the flame and the change of the direction of the flame when the glass fine particles are produced by the flame even if the density of the respective gases is kept uniform.

The points mentioned above will be explained in detail with reference to the example of VAD method. FIG. 1 shows a schematic diagram showing an apparatus for the production of a porous preform of an optical fiber for performing the conventional VAD method.

The burning gas jetted from a burner 5, silicon tetrachloride and additives are reacted in the flame, thereby producing fine particles of silicon dioxide. However, since poisonous gases such as hydrogen chloride are simultaneously produced, these reaction must be performed in a dealed muffle furnace 4. In the drawings, reference numeral 1 denotes a rotating chuck which is rotated and elevated upward, 2 denotes a starting member coupled with the rotating chuck 1 so that the starting member 2 can be rotated with the rotation of the rotating chuck 1, and 3 denotes a porous preform of an optical fiber made of deposited fine particles of silicon dioxide and fine particles of additives. The muffle furnace 4 is substantially a closed structure although there is a clearance between the muffle furnace 4 and the starting member 2 so as to allow smooth rotation of the starting member 2. The burner 5 is projected into inside of the muffle furnace 4 and is coupled to a pipe 7 for delivering the combustion gas, an oxygen delivering pipe 8, silicon chloride gas delivering pipe 9 and additive gas delivering pipe 10. Reference numeral 6 denotes exhausting ports. When the hydrogen gas and oxygen gas coming from the pipes 7 and 8 are supplied into the interior of the muffle furnace 4 by means of the burner 5, the oxyhydrogen flame occurs in the muffle furnace 4. To jet the silicon tetrachloride gas to the oxyhydrogen flame produces silicon dioxide by the flame hydrolysis reaction. Application of additives such as germanium tetrachloride gas from the pipe 10 causes germanium dioxide to be produced by the reaction with the vapor. The germanium dioxide and silicon dioxide are mixed and the particles thereof are deposited on the starting member 2. The starting member 2 is rotated and elevated upward and the porous preform 3 of the optical fiber can be produced.

During the above mentioned process, the uniform distribution of silicon dioxide and germanium dioxide in the flame correlates with the distribution uniform of the silicon dioxide and germanium dioxide in the porous preform 3. By sintering the porous preform 3 a transparent preform of the optical fiber having the desired refractive is obtained. Excessive silicon dioxide and germanium dioxide particles which are not deposited on the starting member 3 are exhausted from the exhausting port 6 as well as hydrogen chloride gas. The gases in the muffle furnace 4 flow mainly along the paths shown by arrow marks M. However, since the muffle furnace 4 is hermetically sealed, an eddy flow shown by arrow marks S1 and S2 occurs. The eddy flow distribution disrupts the flow of the flame between the burner 5 and porous preform which in turn disturbs the correspondence between the density distrubution of the fine glass particles in the flame and the density distribution of germanium dioxide against the silicon dioxide in the deposited porous preform 3. The eddy flow as shown by S2 causes the undeposited fine particles of silicon dioxide and germanium dioxide to be distributed to the inner surface of the wall of the muffle furnace 4. The fine particles thus distributed to the wall of the muffle furnace 4 may be separated from the wall and undesirably distributed to the porous preform 3, thereby resulting in an abnormal deformation and an abnormal distribution of the refractive index and of the porous preform of the optical fiber in addition to occurrence of partial irregular volume density.

SUMMARY OF THE INVENTION

An object of the present invention is to provide an apparatus for the production of a porous preform of the optical fiber in which the density distribution of the fine glass particles of the porous preform deposited on the starting member can correspond exactly to the density distribution of the fine glass particles contained in the flame of the burner.

In order to accomplish the above mentioned object, the present invention provides an apparatus for the production of the porous optical fiber preform which comprises a reaction container in which various gases can flow simultaneously, a means connected to said reaction container for generating gas flow in said reaction container, a means for supporting and moving a starting member across the gas flow in the reaction container so that porous glass is deposited on said starting member, a means for rotating said starting member and a burner for generating glass particles which are deposited on the starting member.

DETAILED DESCRIPTION OF THE PREFERRED EMBODIMENT

Figure 1:
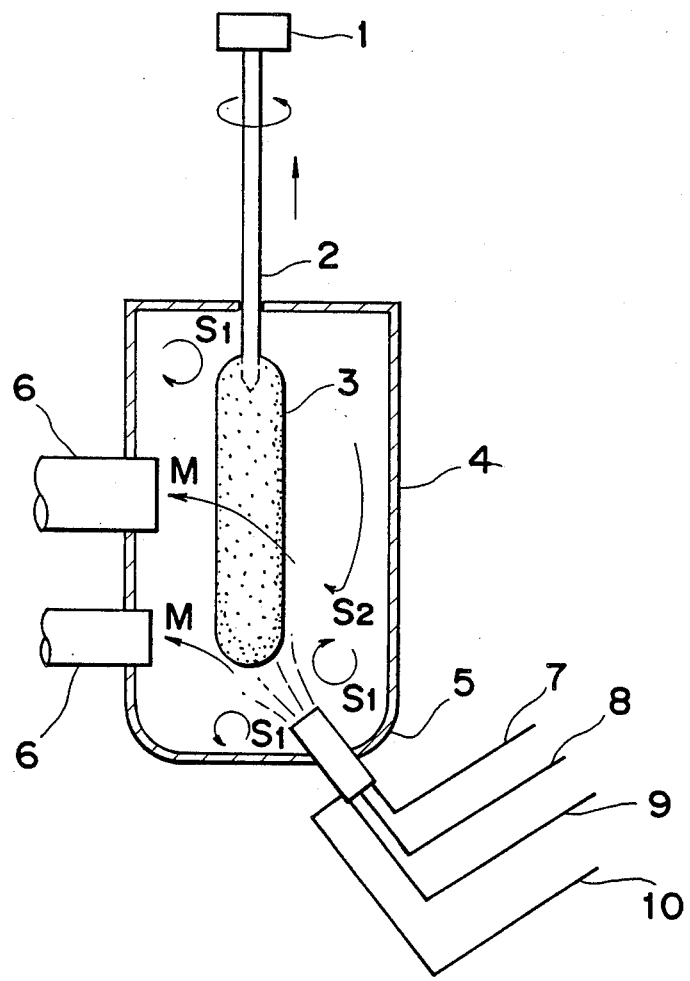
FIG. 1 is a schematic diagram showing an example of a conventional apparatus for producing a porous optical fiber preform.
Figure 2:
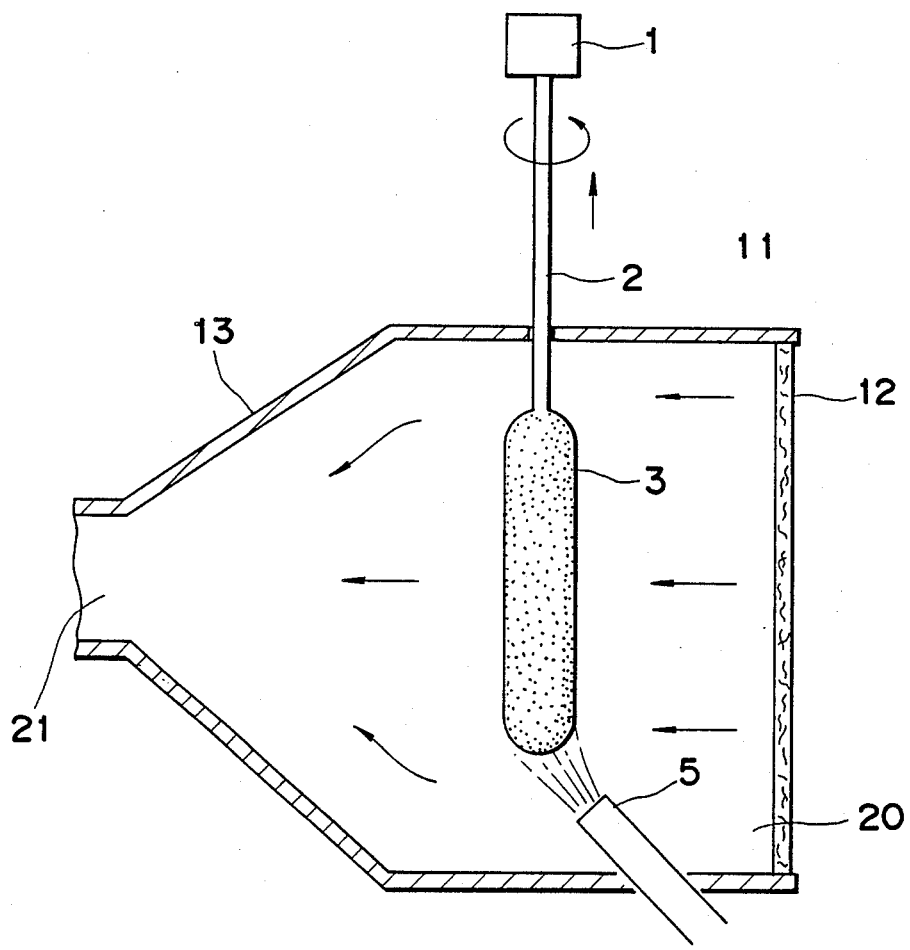
FIG. 2 is a schematic diagram showing an embodiment of an apparatus for producing a porous optical fiber preform according to the present invention.

Referring to FIG. 2 showing an example of the apparatus for producing a porous optical fiber preform according to the present invention, in which VAD method is used, a bar like starting member 2 made of pure quartz is rotatably suspended in the vertical direction in the muffle furnace 11 by a rotating chuck 1 which is disposed outside the muffle furnace 11. A porous optical fiber preform 3 is gradually deposited on the starting member 2 upon rotation and lifting motion of the chuck 1. An oxyhydrogen flame burner 5 is disposed below the lower end of the starting member 2 so that the burner 5 supplies the combustion gas containing glass material with a predetermined spatial distribution density, then the glass particles are produced in the furnace. Upon supplying the glass particles by the burner 5 mentioned above, the porous optical fiber preform 3 is grown on the starting member 2 in the axial direction thereof with the component distribution with respect to the radial direction of the starting member 2 corresponding to the spatial distribution density of the glass particles contained in the combustion gas. The muffle furnace 11 has its one side opened by an opening 20 and the opening 20 is closed with a filter 12. The other side of the furnace 11 opposite to the opening 20 has another opening 21.

Air or nitrogen gas in a rectified flow in the direction shown to the arrow mark is supplied in the interior of the muffle furnace 11 through the filter 12 by which dust contained in the air or nitrogen gas is removed. The interior of the muffle furnace 11 and the starting member 2 and the porous optical fiber preform 3 deposited on the end portion of the starting member 2 can be kept in a uniform gas flow. Thus the flame of the combustion gas containing the glass particles jetted from the burner 5 can be stabilized and the porous optical fiber preform 3 with the desired component distribution can be deposited on the end of the starting member 2. The glass particles which are not deposited on the porous optical fiber preform 3 flow as exhausting gas with the reaction gas and exhausted to the opening 21 through a duct 13 which is formed integral with the muffle furnace 11.

Figure 3:
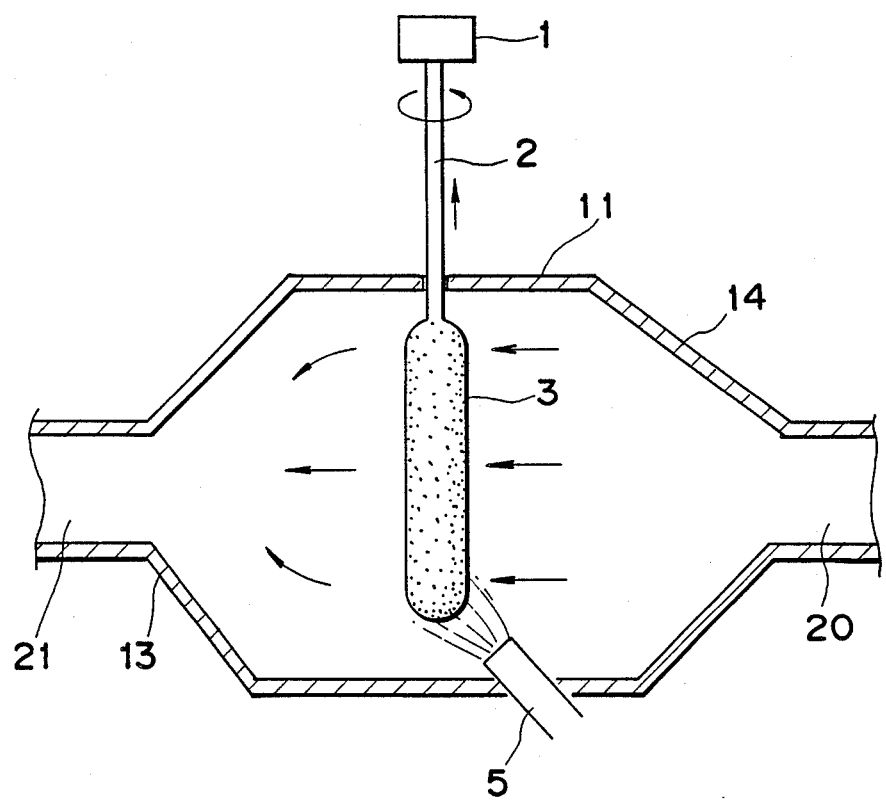
FIG. 3 is a schematic diagram showing another embodiment of the apparatus for producing a porous optical fiber preform according to the present invention.

Referring to FIG. 3 showing another embodiment of the present invention, air or nitrogen gas is cleaned by a high efficiency filter (not shown) and is fed in the muffle furnace 11 in a uniform gas flow from a duct 14 of the muffle furnace 11 having the opening 20 and the reaction gas is exhausted outside through another duct 13 disposed at a position opposite to the duct 14. The way of growth of the porous optical fiber preform 3 is similar to the way in the embodiment shown in FIG. 2.

Although the embodiment of the apparatus for the production of the porous optical fiber preform is explained with reference to the VAD method, the porous optical fiber preform having the desired component distribution can be deposited in the radial direction and longitudinal direction using the external VAD method. In this case a methane burner may be used in place of the oxyhydrogen burner 5.

What is claimed is:

1. An apparatus for the production of a porous optical fiber preform comprising:
    a. a reaction container for allowing a uniform rectified gas flow;
    b. a pair of openings located at opposite ends of said container, one of said openings being for introducing air or nitrogen gas to said container and said other opening being used for exhausting the unnecessary air and gas, from said container;
    c. means for generating a gas flow in said reaction container;
    d. a starting member having a bar like shape movably supported in the reaction container for reciprocally moving across the gas flow; and
    e. means for rotating the starting member and one or more burners disposed in the reaction container directed to said starting member for generating glass particles, thereby depositing the glass particles on the starting member.

2. The apparatus according to claim 1, wherein said one of the opening is closed by a filter.

3. The apparatus according to claim 1, wherein said one of openings is opened to air.

* * * * *